United States Patent
Kakutani

(10) Patent No.: US 11,778,115 B2
(45) Date of Patent: Oct. 3, 2023

(54) IMAGE PROCESSING APPARATUS AND CONTROL METHOD THEREOF

(71) Applicant: CANON KABUSHIKI KAISHA, Tokyo (JP)

(72) Inventor: Naoya Kakutani, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/677,770

(22) Filed: Feb. 22, 2022

(65) Prior Publication Data

US 2022/0279083 A1 Sep. 1, 2022

(30) Foreign Application Priority Data

Feb. 26, 2021 (JP) .............................. JP2021-030076

(51) Int. Cl.
*G06K 15/00* (2006.01)
*H04N 1/00* (2006.01)
*H04N 1/32* (2006.01)

(52) U.S. Cl.
CPC ..... *H04N 1/00854* (2013.01); *H04N 1/00244* (2013.01); *H04N 1/00877* (2013.01); *H04N 1/32101* (2013.01); *H04N 2201/0094* (2013.01)

(58) Field of Classification Search
CPC .......... H04N 1/00854; H04N 1/00244; H04N 1/00877; H04N 1/32101; H04N 2201/0094

See application file for complete search history.

(56) References Cited

U.S. PATENT DOCUMENTS

| | | | |
|---|---|---|---|
| 2003/0011800 A1* | 1/2003 | Miyahara | H04N 1/32122 358/1.15 |
| 2005/0111866 A1* | 5/2005 | Sato | G03G 15/502 399/79 |
| 2005/0138065 A1* | 6/2005 | Ciriza | H04L 67/51 |
| 2017/0371600 A1* | 12/2017 | Tanaka | A61B 5/0022 |
| 2018/0188995 A1* | 7/2018 | Hokiyama | G06F 3/1273 |
| 2021/0006677 A1* | 1/2021 | Ushinohama | H04N 1/00474 |

FOREIGN PATENT DOCUMENTS

JP 2014146206 A 8/2014

* cited by examiner

*Primary Examiner* — Moustapha Diaby
(74) *Attorney, Agent, or Firm* — Canon U.S.A., Inc. IP Division

(57) ABSTRACT

An image processing apparatus that communicates with a server via a network, the image processing apparatuses being configured to use one or more application functions, the image processing apparatus includes a storage unit configured to store an audit log and the one or more application functions in association with each other, a designation unit configured to designate the one or more application functions as an application function for which acquisition of a log by the server is allowed, and a transmission unit configured to transmit the audit log associated with the one or more application functions designated by the designation unit to the server.

14 Claims, 13 Drawing Sheets

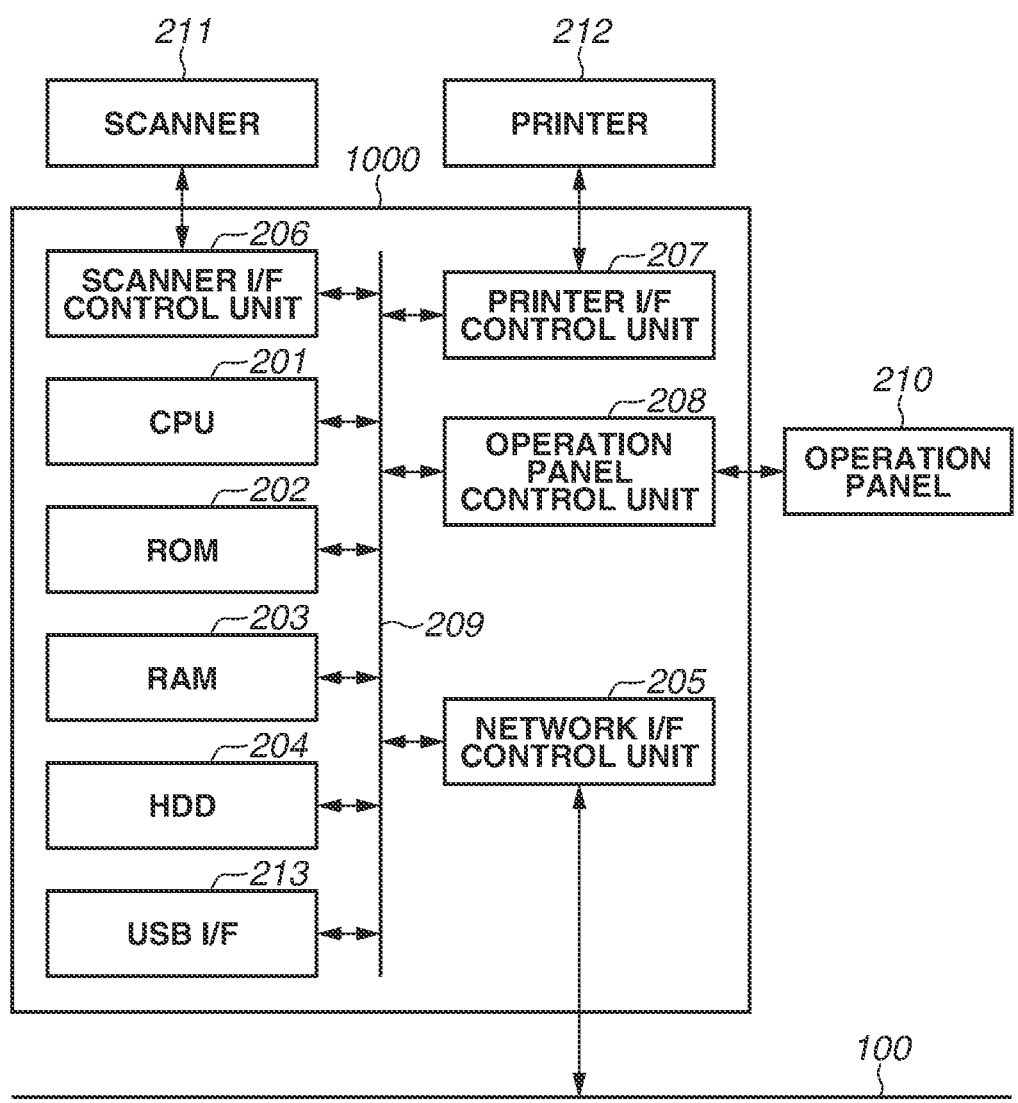

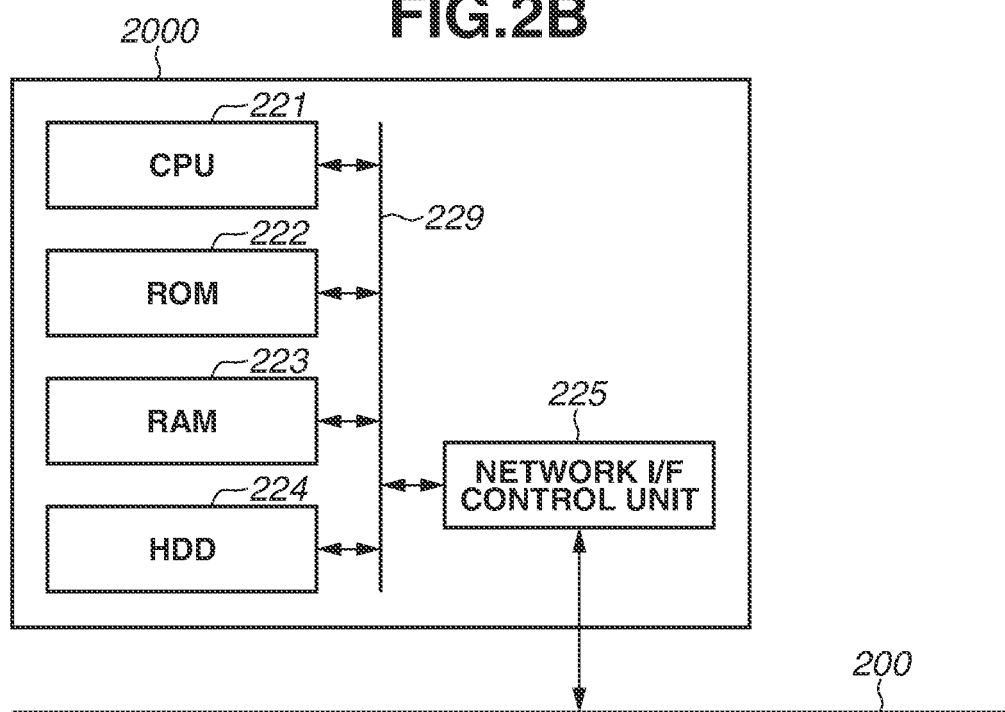
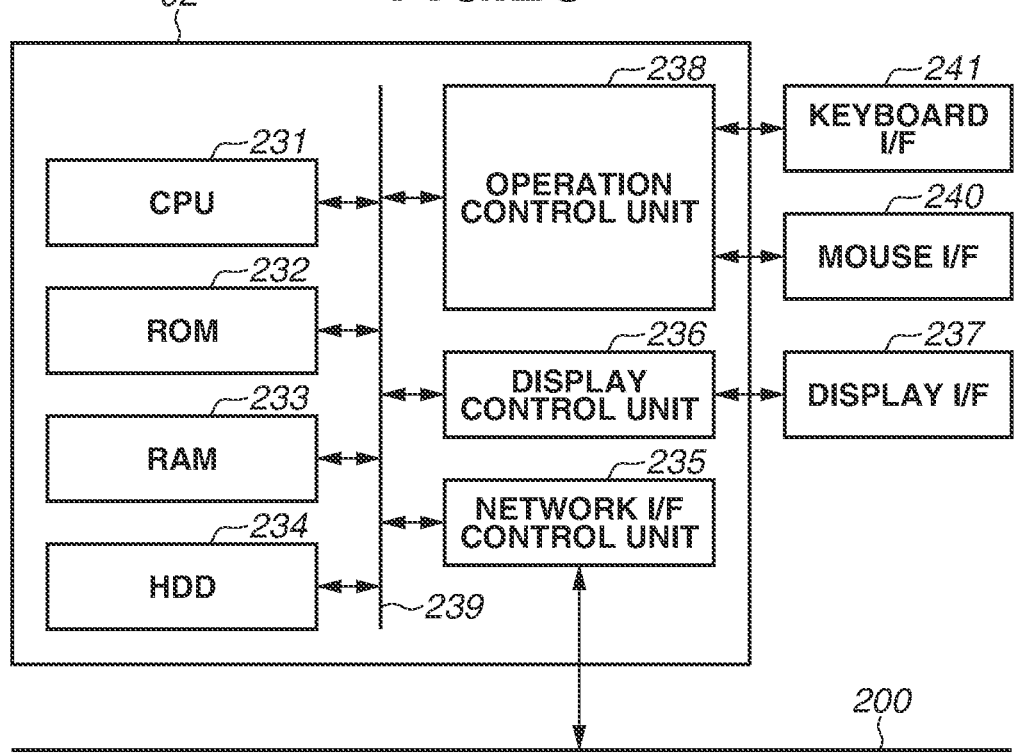

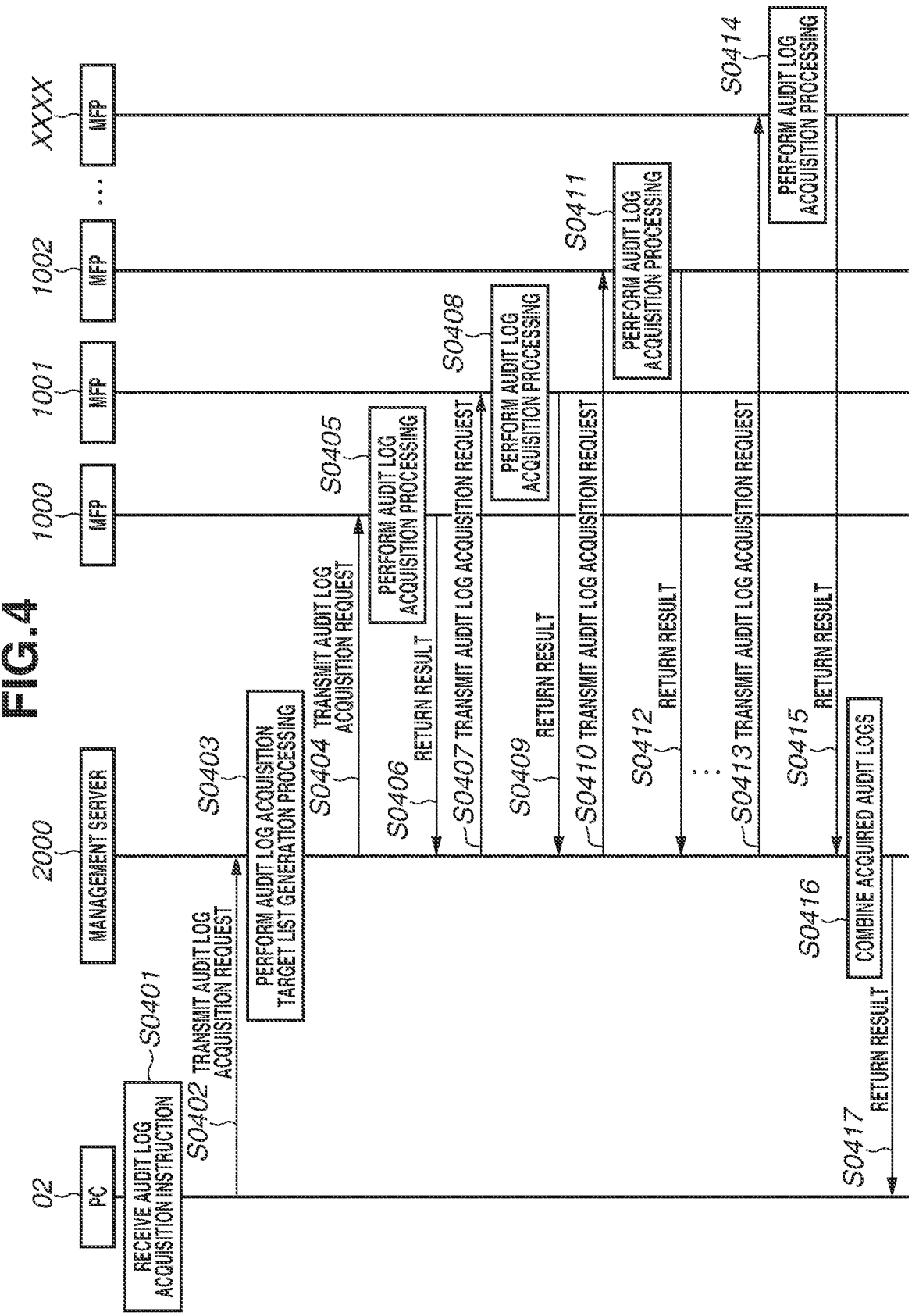

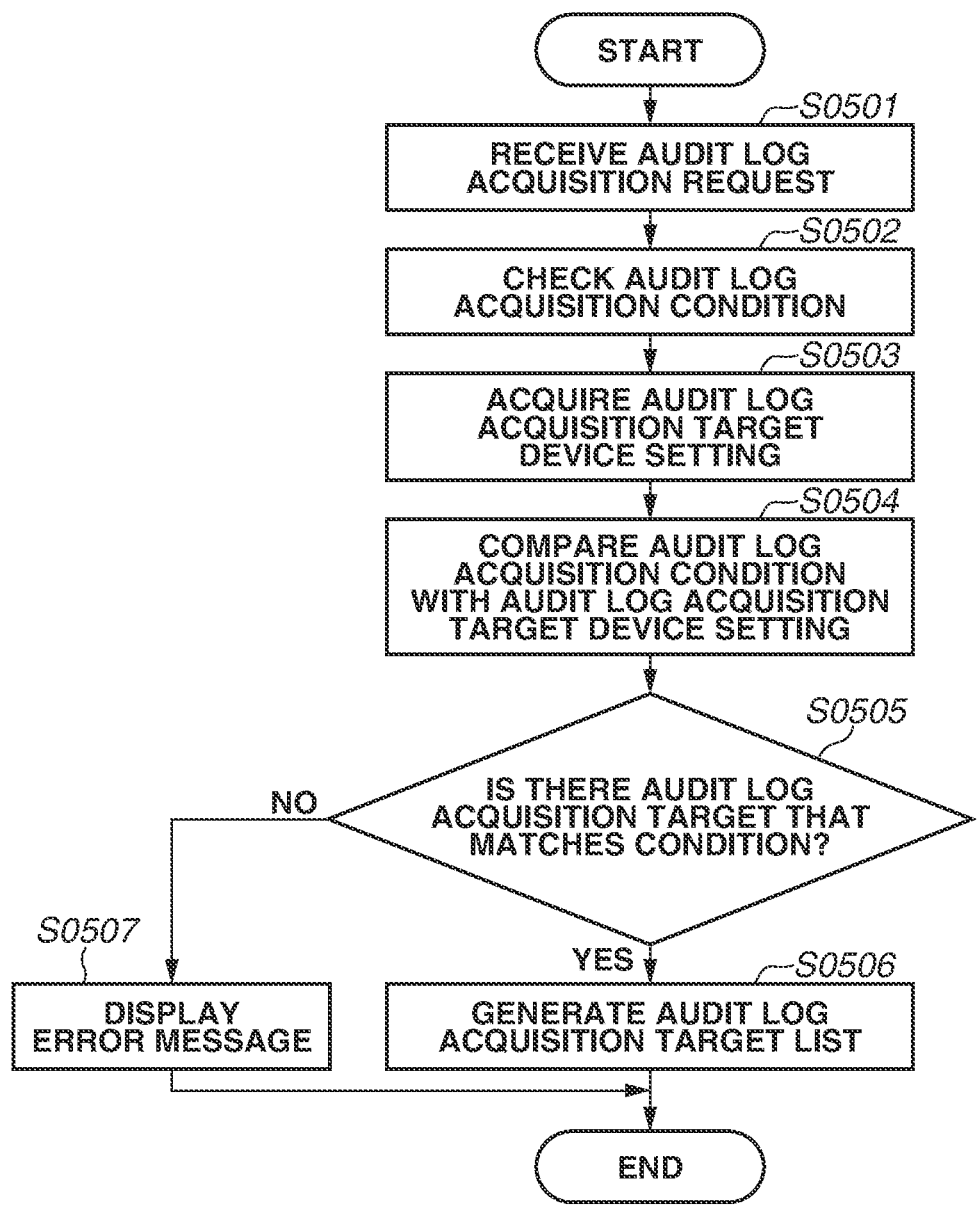

FIG.6

AUDIT LOG ACQUISITION TARGET DEVICE SETTING SCREEN — 601

| USER ID (602) | BELONGING GROUP (603) | ACQUISITION TARGET DEVICE (604) |
|---|---|---|
| user001 | AA DEPARTMENT 01 DIVISION | MFP 1000 |
| user002 | AA DEPARTMENT 01 DIVISION | MFP 1000<br>MFP 1001 |
| user003 | AA DEPARTMENT 01 DIVISION | MFP 1001<br>MFP 1002 |
| user004 | AA DEPARTMENT 02 DIVISION | MFP 1002 |
| user005 | AA DEPARTMENT 02 DIVISION | — |
| user006 | BB DEPARTMENT 01 DIVISION | MFP 1004 |
| user007 | BB DEPARTMENT 02 DIVISION | MFP 1004<br>MFP 1005 |
| ... | ... | ... |
| user100 | ZZ DEPARTMENT 99 DIVISION | MFP XXXX |

[ENTER] ~605    [CANCEL] ~606

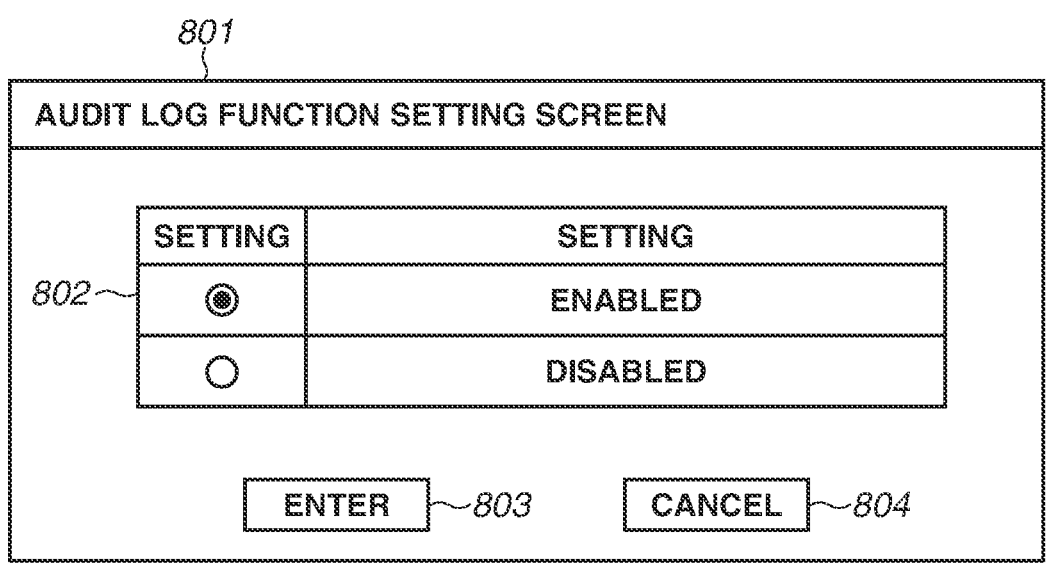

FIG.9

APPLICATION-BASED AUDIT LOG ACQUISITION SETTING SCREEN

| SETTING | SETTING |
|---|---|
| ◉ | ENABLED |
| ○ | DISABLED |

| APPLICATION FUNCTION | AUDIT LOG ACQUISITION |
|---|---|
| COPY | NOT ACQUIRE |
| PRINTER DRIVER PRINT | NOT ACQUIRE |
| PHOTOGRAPH PRINT | NOT ACQUIRE |
| USB PRINT | NOT ACQUIRE |
| CLOUD PRINT | ACQUIRE |
| SCAN | NOT ACQUIRE |
| CLOUD TRANSMISSION | ACQUIRE |
| PRINT FOR SPECIFIC TASK CLOUD SERVICE A | ACQUIRE |

[ ENTER ]   [ CANCEL ]

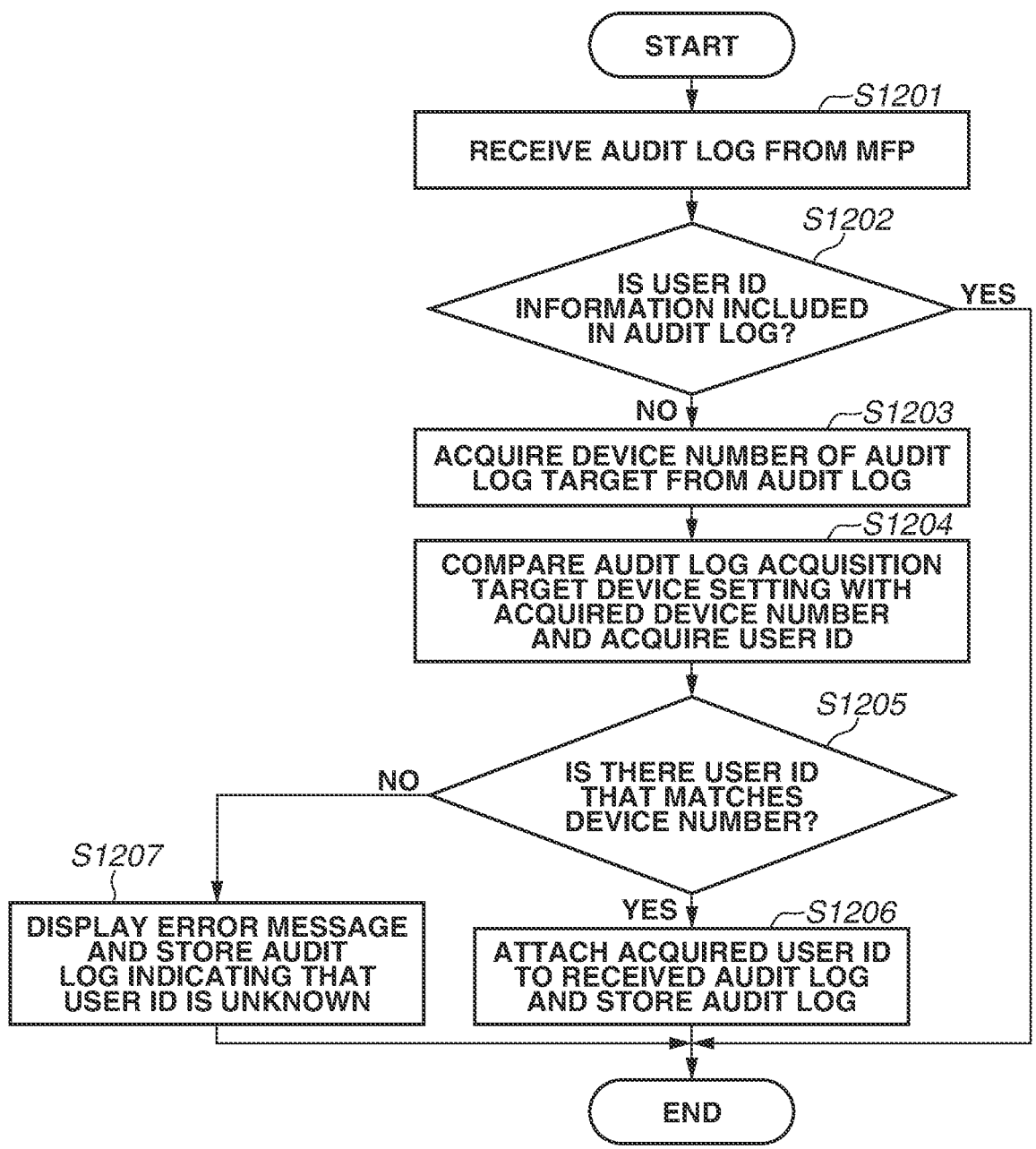

IMAGE PROCESSING APPARATUS AND CONTROL METHOD THEREOF

BACKGROUND

Field of the Disclosure

The present disclosure relates to an audit log function of a printing apparatus to enhance security.

Description of the Related Art

Japanese Patent Application Laid-Open No. 2014-146206 discusses a function for a log management server for accessing a printing apparatus to acquire an audit log.

Such an audit log generally records information about who, when, where, and what in association with a user identifier (ID) and a user name corresponding to a user that has performed user authentication on an information apparatus or a printing apparatus. These pieces of information are used as an audit log to detect an unauthorized operation on the apparatus and identify factors that cause troubles.

SUMMARY

Accordingly, using audit logs of all work-related printing apparatuses become required. However, since various working styles, such as remote work, have been a growing trend in recent years, apparatuses in remote work places, including a satellite office and a home, are also used for a work-related purpose in addition to apparatuses in an office. Therefore, there has been a growing demand for acquiring a work-related audit log from an apparatus or the like in a remote work place including a home.

According to embodiments of the present disclosure, an image processing apparatus that communicates with a server via a network and is configured to use one or more application functions, the image processing apparatus includes a storage unit configured to store a log in association with the one or more application functions, a designation unit configured to designate the one or more application functions as an application function for which acquisition of a log by the server is allowed, and a transmission unit configured to not transmit a log associated with the one or more application functions that are not designated by the designation unit, to the server, and to transmit a log associated with the one or more application functions designated by the designation unit to the server.

Further features of the present disclosure will become apparent from the following description of exemplary embodiments with reference to the attached drawings.

BRIEF DESCRIPTION OF THE DRAWINGS

FIG. 2A is a block diagram illustrating a hardware configuration example of a multifunction peripheral (MFP) according to the exemplary embodiment. FIG. 2B is a block diagram illustrating a hardware configuration example of a management server according to the exemplary embodiment. FIG. 2C is a block diagram illustrating a hardware configuration example of a personal computer (PC).

FIG. 4 is a sequence diagram illustrating an example of a processing procedure from reception of an audit log acquisition instruction to transmission of an audit log according to the exemplary embodiment.

FIG. 5 is a flowchart illustrating an example of an audit log acquisition target list generation processing procedure according to the exemplary embodiment.

FIG. 6 is a diagram illustrating an example of an audit log acquisition target device setting screen according to the exemplary embodiment.

FIG. 8 is a diagram illustrating an example of an audit log function setting screen according to the exemplary embodiment.

FIG. 9 is a diagram illustrating an example of an application-based audit log acquisition setting screen according to the exemplary embodiment.

FIG. 12 is a flowchart illustrating a processing procedure of acquiring authentication information in the management server that has received the audit log according to yet another exemplary embodiment.

DESCRIPTION OF THE EMBODIMENTS

Exemplary embodiments of the present disclosure will be described below with reference to the drawings. In exemplary embodiments of the present disclosure, a multifunction peripheral (MFP), e.g., a printing apparatus, an image forming apparatus, or a digital MFP, including a user authentication function is used. However, since the user authentication function is generally used not only in an MFP, but also in a single function peripheral (SFP) and an image processing apparatus, the application of the present disclosure is not limited only to an MFP.

Figure 1:
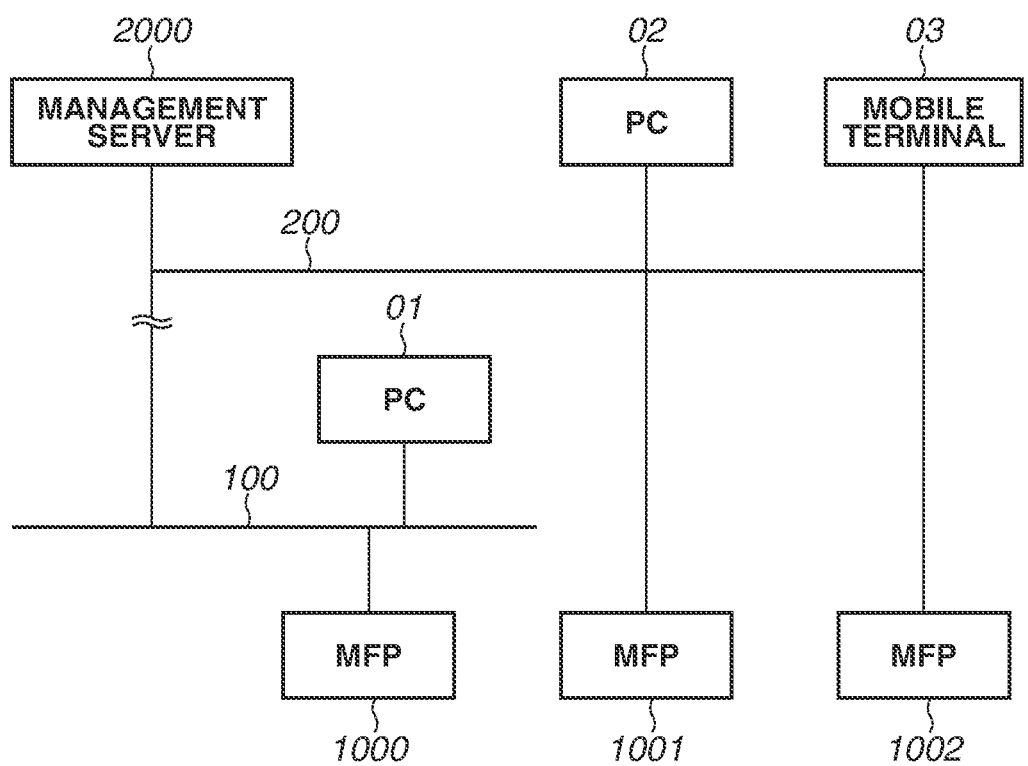
FIG. 1 is a block diagram illustrating an example of a system configuration according to an exemplary embodiment of the present disclosure.

FIG. 1 is a block diagram illustrating a network configuration according to a first exemplary embodiment. In the present exemplary embodiment, a configuration in which a plurality of printing apparatuses and a server can communicate with each other via a network as illustrated in FIG. 1 is referred to as a printing system.

An MFP 1000 including a print function and an audit log function can transmit and receive data, such as print data, scanned image data, and device management information, to and from an information processing apparatus via an internal network 100. In the present exemplary embodiment, an MFP 1002 includes a print function and an audit log function, but does not include an authentication function. The MFPs 1000 to 1002 include some application functions and can perform printing using a function selected by a user. Examples of the application functions include a cloud print function and a photograph print function as described in detail below.

An audit log in the present exemplary embodiment is, for example, a job log providing information about an operation history of a user and a device, which includes information about who has been performed, what processing has been performed, and when and where the processing has been performed. Examples of the audit log further includes a user interface (UI) operation log, a record on image data at the time of execution of scanning and printing, and packet information used during network communication. Since a type of an audit log to be used in an audit depends on what kind of information an administrator desires to audit, the type of the audit log is not particularly limited here.

The MFP 1000 can also communicate with a management server 2000 via the internal network 100 and an external network 200. In the present exemplary embodiment, the internal network 100 is an in-house network protected by a firewall or gateway in an office and the external network 200 is a network that can be directly accessed via the Internet. However, the internal network 100 and the external network 200 are not particularly limited. A personal computer (PC) 01 can perform user authentication for the MFP 1000, and can refer to and operate the MFP 1000 via the internal network 100.

The management server 2000 can communicate with the MFPs 1000 to 1002, the PC 01, and a mobile terminal 03 via the external network 200. An MFP 1001 and the MFP 1002 are directly connected to the external network 200. In the present exemplary embodiment, the MFP 1001 is installed in a shared space, such as a core working space, and the MFP 1002 is installed in a home as a remote work place where the user is working from. However, the locations where the MFP 1001 and the MFP 1002 are installed are not particularly limited. A PC 02 and the mobile terminal 03 can perform user authentication, and can refer to and operate the MFPs via the external network 200.

In the present exemplary embodiment, each of the MFPs 1000 to 1002 can perform scanning and printing in itself, and can also execute printing and store scanned data via the management server 2000.

FIG. 1 illustrates an example where three MFPs, one management server, two PCs, and one mobile terminal are provided. However, a plurality of MFPs, a plurality of management servers, a plurality of PCs, and a plurality of mobile terminals may be provided. The number of MFPs, the number of management servers, the number of PCs, and the number of mobile terminals are not particularly limited. The management server 2000 may also be connected to another cloud storage via the external network 200. The connection configuration of the management server 2000 is not particularly limited.

FIG. 2A is a block diagram illustrating a schematic configuration of the MFP 1000 according to the present exemplary embodiment.

A central processing unit (CPU) 201 executes software programs for the MFP 1000 and controls overall operation of the MFP 1000. A read-only memory (ROM) 202 stores a boot program, fixed parameters, and the like for the MFP 1000. A random access memory (RAM) 203 is used to, for example, store programs and temporarily store data when the CPU 201 controls the MFP 1000. A hard disk drive (HDD) 204 stores system software, applications, and various data. The CPU 201 executes the boot program stored in the ROM 202, loads programs stored in the HDD 204 into the RAM 203, and executes the loaded programs, to control operation of the MFP 1000. A network interface (I/F) control unit 205 controls transmission and reception of data via the internal network 100. A scanner I/F control unit 206 controls a document scanning operation performed by a scanner 211. A printer I/F control unit 207 controls print processing and the like performed by a printer 212. An operation panel control unit 208 controls an operation panel 210 of a touch-screen type, display of various information, and input of instructions from the user. A universal serial bus (USB) I/F 213 controls a connection with a USB memory. A bus 209 interconnects the CPU 201, the ROM 202, the RAM 203, the HDD 204, the network I/F control unit 205, the scanner I/F control unit 206, the printer I/F control unit 207, the operation panel control unit 208, and the USB I/F 213. Control signals from the CPU 201 and data signals to be exchanged between apparatuses are transmitted and received via the bus 209.

The MFP 1001 and the MFP 1002 according to the present exemplary embodiment have a configuration similar to that of the MFP 1000 illustrated in FIG. 2A.

FIG. 2B is a block diagram illustrating a schematic configuration of the management server 2000 according to the present exemplary embodiment.

A CPU 221 executes software programs for the management server 2000 and controls overall operation of the management server 2000. A ROM 222 stores a boot program, fixed parameters, and the like for the management server 2000. A RAM 223 is used to store programs and temporarily store data when the CPU 221 controls the management server 2000. An HDD 224 stores system software, applications, and various data. The CPU 221 executes the boot program stored in the ROM 222, loads programs stored in the HDD 224 into the RAM 223, and executes the loaded programs, to control operation of the management server 2000. A network I/F control unit 225 controls transmission and reception of data via the internal network 100. An operation unit of the management server 2000 can be operated from the PC 02 or the mobile terminal 03 via the network I/F control unit 225. In the present exemplary embodiment, the operation unit to be displayed on the PC 02 or the mobile terminal 03 is referred to as a remote UI. A bus 229 interconnects the CPU 221, the ROM 222, the RAM 223, the HDD 224, and the network I/F control unit 225. Control signals from the CPU 221 and data signals to be exchanged between apparatuses are transmitted and received via the bus 229.

FIG. 2C is a block diagram illustrating a schematic configuration of the PC 02. In the PC 02, a CPU 231 performs overall control of accesses between units connected to a bus 239 based on a control program stored in a ROM 232 or an HDD 234. The ROM 232 stores the control program and the like that can be executed by the CPU 231. A RAM 233 functions mainly as a main memory, a work area, and the like of the CPU 231, and a memory capacity of the RAM 233 can be expanded by connecting an optional RAM to an additional port (not illustrated). The HDD 234 stores a boot program, various applications, font data, user files, edit files, and the like. While, the HDD 234 is utilized in an embodiment of the present exemplary embodiment, a secure digital (SD) card, a flash memory, or the like may be used as an external memory device. A network I/F control unit 235 controls transmission and reception of data to/from the external network 200. A display control unit 236 controls display of a display I/F 237. An operation control unit 238 controls an operation signal of a keyboard I/F 241 and a mouse I/F 240. The keyboard I/F 241 controls key input. The mouse I/F 240 controls input from a pointing device (not illustrated). The operation unit of the management server 2000 according to an embodiment of the present exemplary embodiment is displayed by an UI on a web browser which is displayed by the display I/F 237 of the PC 02, via the network I/F control unit 235. An operation for the management server 2000 is performed on the UI on the web browser by using the keyboard I/F 241 and the mouse I/F 240. In an embodiment of the present exemplary embodiment, such an UI using a web browser via a network is referred to as a remote UI. The bus 239 connects the CPU 231, the ROM 232, the RAM 233, the HDD 234, the network I/F control unit 235, the display control unit 236, and the operation control unit 238 with each other. A control signal and a data signal are transmitted and received between the units via the bus 239.

Figure 3A:
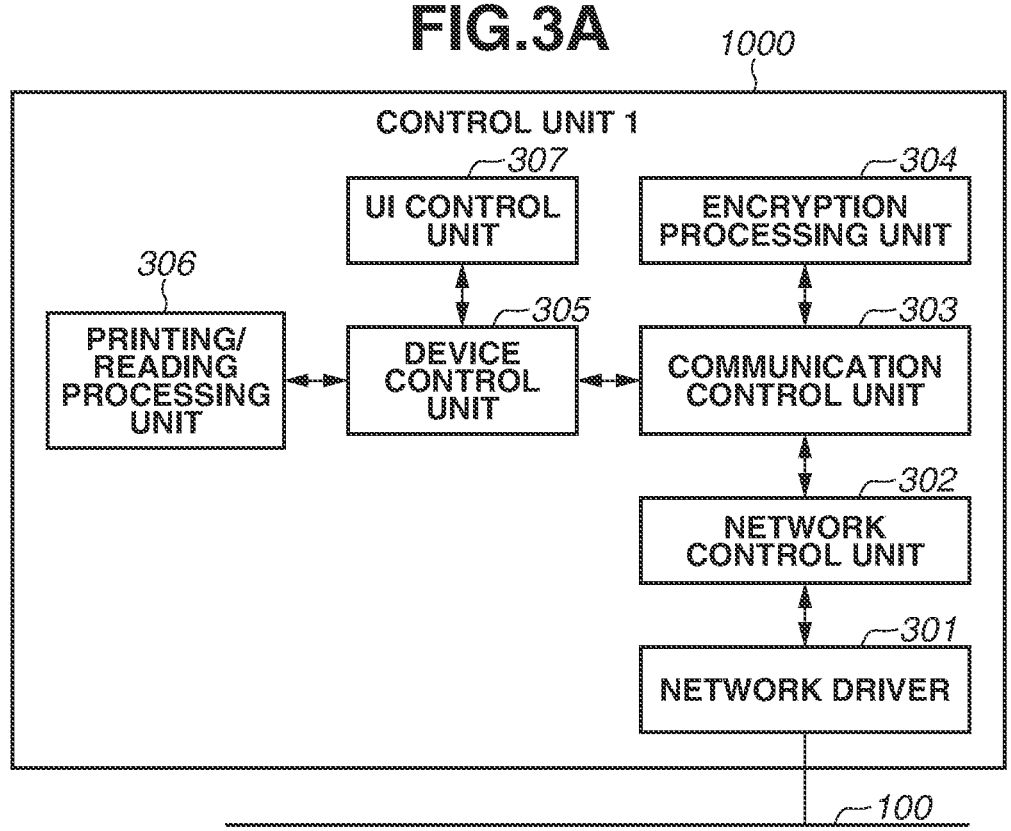
FIG. 3A is a block diagram illustrating a software configuration example of the MFP according to the exemplary embodiment.

FIG. 3A is a block diagram illustrating software modules included in the MFP 1000 according to the first exemplary embodiment. The software modules illustrated in FIG. 3A are implemented such that the CPU 201 executes programs loaded in the RAM 203.

A network driver 301 controls the network I/F control unit 205 connected to the internal network 100, to transmit and receive data to and from an external apparatus via the internal network 100. A network control unit 302 performs data exchange by controlling communication in a transport layer and lower layers in a network communication protocol such as Transmission Control Protocol/Internet Protocol (TCP/IP). A communication control unit 303 is a module for controlling a plurality of communication protocols supported by the MFP 1000. Encryption communication using Transport Layer Security (TLS) supported by the MFP 1000 is also executed by the communication control unit 303.

An encryption processing unit 304 is a module for executing various cryptographic processing, such as data encryption and decryption processing, generation and verification of electronic signatures, and generation of hash values. The encryption processing unit 304 performs encryption processing also in encryption communication processing using TLS executed by the communication control unit 303.

A device control unit 305 is a module for generating control commands and control data for the MFP 1000 and controlling operation of the MFP 1000 in an integrated manner. User authentication instructed via the operation panel 210, the operation panel control unit 208, or the network I/F control unit 205 is executed by the device control unit 305. The device control unit 305 records an operation history of the MFP 1000 as an audit log on the HDD 204.

A printing/reading processing unit 306 is a module for executing functions, such as printing by the printer 212 and document scanning by the scanner 211. In the present exemplary embodiment, scanning and printing instructions for the MFP 1000 can also be issued in response to a user operation performed on the operation panel 210. The operation panel 210 and the operation panel control unit 208 are controlled by a UI control unit 307.

A control unit including the software modules of the MFP 1000 illustrated in FIG. 3A described above is hereinafter referred to as a control unit 1. In the present exemplary embodiment, the control unit 1 includes the CPU 201, the ROM 202, the RAM 203, and the HDD 204 of the MFP 1000. In the present exemplary embodiment, the control unit 1 is not limited to the control unit including the software modules included in the MFP 1000, but instead may be a control unit including software modules similar to the software modules included in the MFP 1001 or the MFP 1002. In sequences and flowcharts to be described below, processes to be performed by the MFP 1000 are stored in any one of the ROM 202, the RAM 203, and the HDD 204 of the control unit 1 and are executed by the CPU 201.

Figure 3B:
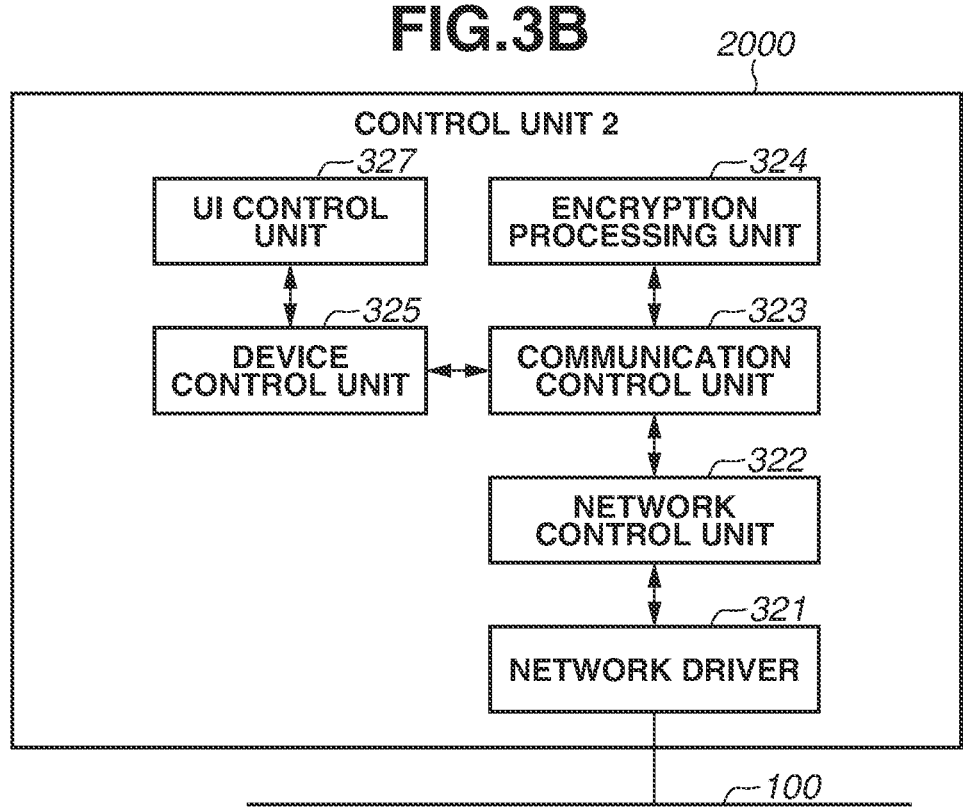
FIG. 3B is a block diagram illustrating a software configuration example of the management server according to the exemplary embodiment.

FIG. 3B is a block diagram illustrating software modules included in the management server 2000 according to the first exemplary embodiment. The software modules illustrated in FIG. 3B are implemented such that the CPU 221 executes programs loaded in the RAM 223.

A network driver 321 controls the network I/F control unit 225 connected to the internal network 100, to transmit and receive data to and from an external apparatus via the internal network 100.

A network control unit 322 performs data exchange by controlling communication in the transport layer and lower layers in a network communication protocol such as TCP/IP. A communication control unit 323 is a module for controlling a plurality of communication protocols supported by the management server 2000. Encryption communication using TLS supported by the management server 2000 is also executed by the communication control unit 323.

An encryption processing unit 324 is a module for executing various cryptographic processing, such as data encryption and decryption processing, generation and verification of electronic signatures, and generation of hash values. The encryption processing unit 324 performs encryption processing also in encryption communication processing using TLS executed by the communication control unit 323.

A device control unit 325 is a module for generating control commands and control data for the management server 2000 and controlling operation of the management server 2000 in an integrated manner. The device control unit 325 records an operation history of the MFP 1000 as an audit log on the HDD 224.

In the present exemplary embodiment, the management server 2000 is operated by the remote UI that can be operated from the PC 02 or the mobile terminal 03 via the network I/F control unit 225. This is controlled by a UI control unit 327.

A control unit including the software modules of the management server 2000 illustrated in FIG. 3B described above is hereinafter referred to as a control unit 2. In the present exemplary embodiment, the control unit 2 includes the CPU 221, the ROM 222, the RAM 223, and the HDD 224 of the management server 2000. In procedures of sequences and flowcharts to be described below, processes to be performed by the management server 2000 are stored in any one of the ROM 222, the RAM 223, and the HDD 224 of the control unit 2 and are executed by the CPU 221.

FIG. 4 is a sequence diagram illustrating an overall processing procedure for the management server 2000 to acquire an audit log of each MFP including the audit log function in the system according to the first exemplary embodiment.

The system according to the present exemplary embodiment includes the MFPs 1000 to 1002 each of which performs user authentication, receives a printing instruction via the operation unit, and performs printing control, the management server 2000 that acquires an audit log from each of the MFPs 1000 to 1002, and the PC 02 that shares the audit log acquired from the MFPs 1000 to 1002 via the remote UI with the management server 2000. The management server 2000 and the MFPs 1000 to 1002 are separate apparatuses, but instead the function of the management server 2000 may be included in each of the MFPs 1000 to 1002. The configuration of the management server 2000 is not particularly limited.

This sequence is started upon reception of an audit log acquisition instruction issued for the management server 2000.

In step S0401, the control unit 2 of the management server 2000 receives the audit log acquisition instruction from the user via the remote UI that is served as the operation unit of the management server 2000 and is displayed on the PC 02.

In step S0402, the PC 02 transmits the received audit log acquisition instruction to the management server 2000 as an audit log acquisition request.

In step S0403, the control unit 2 performs audit log acquisition target list generation processing based on user information included in the received audit log acquisition request.

FIG. 5 is a flowchart illustrating the audit log acquisition target list generation processing to be started in the processing of step S0403 illustrated in FIG. 4. This processing is achieved such that the CPU 221 of the control unit 2 executes programs loaded in the RAM 223.

In step S0501, the control unit 2 receives the audit log acquisition request. In the present exemplary embodiment, the audit log acquisition request includes user information, such as a user identifier (ID), about the user that operates the remote UI, and an audit log acquisition condition. In the present exemplary embodiment, the audit log acquisition condition is an acquisition target condition indicating that, for example, all audit logs are to be acquired, only an audit log of a specific department or a specific user is to be acquired, or an audit log recorded during a certain period of time is to be acquired.

In step S0502, the control unit 2 checks the audit log acquisition condition included in the audit log acquisition request, and holds the audit log acquisition condition in the RAM 223.

In step S0503, the control unit 2 acquires an audit log acquisition target device setting from the HDD 224.

FIG. 6 illustrates a screen 601 on which an audit log acquisition target device setting according to the present exemplary embodiment is performed. The screen 601 is displayed by the remote UI via the network I/F control unit 225 of the management server 2000. In the present exemplary embodiment, the screen 601 is also referred to as a management table.

The screen 601 according to the present exemplary embodiment includes a user ID setting 602, a belonging group setting 603, an acquisition target device setting 604, an enter button 605, and a cancel button 606. A setting to be performed on the screen 601 is a setting for determining from which of the MFPs the audit log is to be acquired, in a case where the audit log acquisition request is issued for a user ID or a belonging group. For example, according to the screen 601 illustrated in FIG. 6, in a case where an audit log acquisition request for acquiring an audit log corresponding to user001 is issued, the acquisition target device is the MFP 1000, and in a case where an audit log acquisition request for acquiring an audit log corresponding to user002 is issued, the acquisition target devices are MFPs 1000 and 1001. In a case where an audit log acquisition request for acquiring an audit log corresponding to "AA department 01 division" is issued, the MFPs 1000, 1001, and 1002 associated with user IDs belonging to "AA department 01 division" are the audit log acquisition target devices. In the present exemplary embodiment, the audit log acquisition target device setting is set in advance via the remote UI by an administrator of the management server 2000 or the MFPs. When the enter button 605 is pressed, the control unit 2 stores setting values in the HDD 224.

After the processing of step S0503, the processing proceeds to step S0504.

In step S0504, the control unit 2 compares the audit log acquisition condition acquired in steps S0502 with the audit log acquisition target device setting acquired in S0503.

In step S0505, the control unit 2 determines whether there is an audit log acquisition target that matches the condition according to a result of comparison in step S0504.

In step S0505, in a case where the control unit 2 determines that there is the audit log acquisition target that matches the condition (YES in step S0505), the processing proceeds to step S0506. In step S0506, the control unit 2 generates an audit log acquisition target list and stores the generated audit log acquisition target list in the RAM 223. Then, the processing illustrated in FIG. 5 is terminated. This audit log acquisition target list is data including information indicating from which of the MFPs the audit log is to be acquired by the management server 2000 in processing subsequent to step S0404 illustrated in FIG. 4.

In step S0505, in a case where the control unit 2 determines that there is no audit log acquisition target that matches the condition (NO in step S0505), the processing proceeds to step S0507. In step S0507, the control unit 2 displays an error message on the remote UI to notify that audit log acquisition processing has been failed. Then, the processing illustrated in FIG. 5 is terminated. Then, the processing proceeds to step S0417 illustrated in FIG. 4. In step S0417, the processing result is displayed on the remote UI. Then, the processing illustrated in FIG. 4 is terminated.

An example of branching the processing of steps S0505 to S0507 in accordance with the condition based on the audit log acquisition request will be described with reference to FIG. 6. In a case where the control unit 2 receives the audit log acquisition request for user001 in step S0501, as an example case, as illustrated in FIG. 6, the MFP 1000 is set for user001 in the acquisition target device setting 604 and the condition matches the audit log acquisition request. Accordingly, the processing proceeds to step S0506. In a case where the control unit 2 receives the audit log acquisition request for user005 in step S0501, as an example, as illustrated in FIG. 6, there is no MFP set for user005, and thus the condition does not match the audit log acquisition request. Accordingly, the processing proceeds to step S0507.

After the processing illustrated in FIG. 5, the processing proceeds to step S0404 illustrated in FIG. 4.

Step S0404 and subsequent steps are processes to be performed when the processing proceeds to step S0506 illustrated in FIG. 5 and the audit log acquisition target list is generated. The processes of step S0404 and subsequent steps are described using a case where the audit log acquisition target list includes the MFPs 1000, 1001, 1002, . . . , and XXXX.

In step S0404, the control unit 2 of the management server 2000 transmits the audit log acquisition request to the MFP 1000.

In step S0405, the control unit 1 of the MFP 1000 performs audit log acquisition processing.

Figure 7:
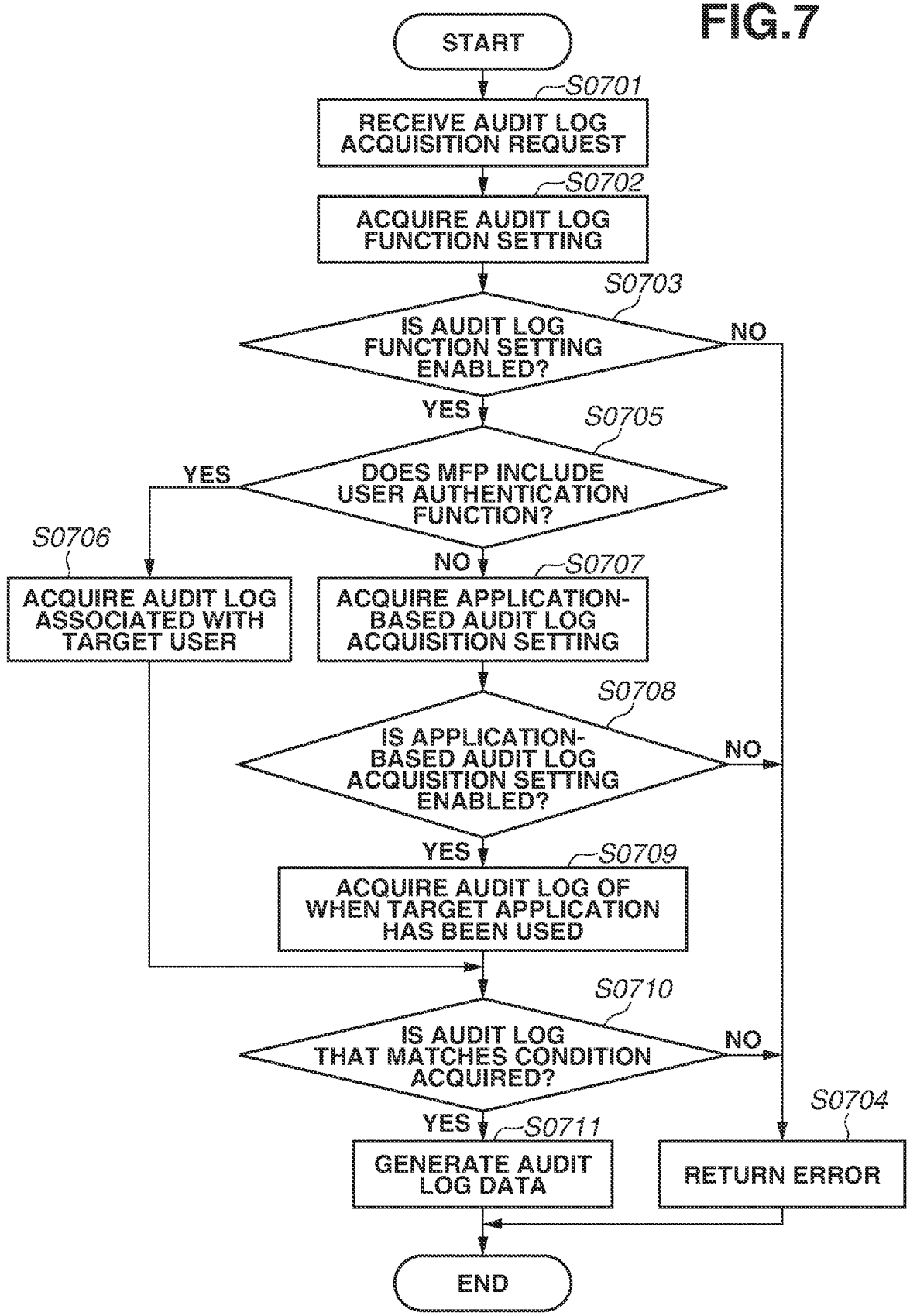
FIG. 7 is a flowchart illustrating an example of an audit log acquisition processing procedure according to the exemplary embodiment.

FIG. 7 is a flowchart illustrating the audit log acquisition processing to be started in the processing of step S0405 illustrated in FIG. 4. This processing is achieved such that the CPU 201 of the control unit 1 executes programs loaded in the RAM 203.

In step S0701, the control unit 1 receives the audit log acquisition request from the management server 2000. This audit log acquisition request includes information about the audit log acquisition condition used in step S0402 illustrated in FIG. 4 and in step S0502 illustrated in FIG. 5.

In step S0702, the control unit 1 acquires an audit log function setting for the MFP 1000 from the HDD 204.

FIG. 8 illustrates a screen 801 on which an audit log function setting according to the present exemplary embodiment is performed. The screen 801 for the audit log function setting is displayed on the operation panel 210 of each of the MFPs 1000, 1001, and 1002.

In the present exemplary embodiment, the screen 801 includes a select button 802, an enter button 803, and a cancel button 804. The audit log function setting is a setting for determining whether the MFP 1000 records the audit log. In a case where the audit log setting is enabled, the MFP 1000 causes the control unit 1 to record the audit log on the HDD 204. In a case where the enter button 803 is pressed on the operation panel 210, the control unit 1 stores setting values in the HDD 204. In the present exemplary embodiment, the audit log function can be switched between an enabled state and a disabled state. However, the MFPs 1000 to 1002 may not include the selectable options for the audit log function, and the audit log function may be constantly enabled. The audit log function is not particularly limited.

In step S0703, the control unit 1 determines whether the audit log function of the MFP 1000 is enabled.

In step S0703, in a case where the control unit 1 determines that the audit log function of the MFP 1000 is disabled (NO in step S0703), the audit log cannot be acquired and thus the processing proceeds to step S0704. In step S0704, the control unit 1 returns an error. Then, the processing illustrated in FIG. 7 is terminated.

In step S0703, in a case where the control unit 1 determines that the audit log function of the MFP 1000 is enabled (YES in step S0703), the processing proceeds to step S0705.

In step S0705, the control unit 1 determines whether the MFP 1000 includes the user authentication function. In a case where the MFP 1000 includes the user authentication function and also the user authentication function included in the MFP 1000 is enabled, it can be determined that the MFP 1000 includes the user authentication function. In a case where the MFP 1000 includes the user authentication function but the user authentication function is disabled, the control unit 1 determines that the MFP 1000 does not include the user authentication function. In the present exemplary embodiment, information about whether the MFP 1000 includes the user authentication function is preliminarily recorded by a program in the MFP 1000. In a case where the MFP 1000 includes the user authentication function, the control unit 1 performs the determination by acquiring a user authentication function setting from the HDD 204.

In step S0705, in a case where the control unit 1 determines that the MFP 1000 includes the user authentication function and the user authentication function is enabled (YES in step S0705), the processing proceeds to step S0706. In step S0706, the control unit 1 acquires the audit log associated with the user information in the audit log acquisition condition acquired in step S0701 from the HDD 204.

In step S0705, in a case where the control unit 1 determines that the MFP 1000 does not include the user authentication function or that the user authentication function is not enabled (NO in step S0705), the processing proceeds to step S0707. In step S0707, the control unit 1 acquires an application-based audit log acquisition setting from the HDD 204.

Although not illustrated, even in a case where the control unit 1 determines that the MFP 1000 includes the user authentication function and the user authentication function is enabled, an audit log of an application, for which audit log acquisition is allowed, of a target user may be transmitted, based on a setting provided for enabling audit log acquisition only for the allowed application.

Specifically, even in a case where the control unit 1 determines that the MFP 1000 includes the user authentication function in step S0705 (YES in step S0705), the processing may proceed to step S0707, and then in step S0709, the audit log of a target application of an audit target operating user may be acquired.

FIG. 9 illustrates a screen 901 on which the application-based audit log acquisition setting according to the present exemplary embodiment is performed. The screen 901 for the application-based audit log acquisition setting is displayed on the operation panel 210 of the MFP 1000. On the screen 901, the user that operates the MFP 1000 can designate an application function for which audit log acquisition is allowed.

The screen 901 according to the present exemplary embodiment includes a select button 902, an application function setting 903, an audit log acquisition setting 904, an enter button 905, and a cancel button 906.

The application-based audit log acquisition setting is a setting for determining whether the audit log is acquired based on application functions of the MFP 1000. In the present exemplary embodiment, the select button 902 can be set when the select button 802 illustrated in FIG. 8 is enabled. The application function setting 903 and the audit log acquisition setting 904 can be set only when the select button 902 is enabled.

In the example illustrated in FIG. 9, the select button 902 is enabled. In the present exemplary embodiment, the MFP 1000 includes a copy function, a printer driver print function, a photograph print function, a USB print function, a cloud print function, a scan function, a cloud transmission function, and a function of printing for a specific task cloud service A. In the present exemplary embodiment, the copy function is a function for outputting image data scanned by the scanner 211 using the printer 212. The printer driver print function is a function for transmitting print data from a printer driver on the PC 02 to the MFP 1000 via the internal network 100 or the external network 200, causing the MFP 1000 to receive the print data via the network I/F control unit 205, and causing the printer 212 to perform printing. The photograph print function is a function for printing image data which has been corrected to image data with an image quality for photograph, using the printer I/F control unit 207 and the printer 212 under control of the device control unit 305 of the MFP 1000. The USB print function is a function for printing image data on a USB memory connected to a USB I/F of the MFP 1000. The cloud print function is a function for printing print data stored in a cloud service storage connected to the MFP 1000 via the internal network 100 or the external network 200. The scan function is a function for transmitting image data scanned by the scanner 211 of the MFP 1000 via an electronic mail (e-mail) or facsimile (FAX). The cloud transmission function is a function for transmitting image data scanned by the scanner 211 of the MFP 1000 to a cloud service storage on the internal network 100 or the external network 200. The function of printing for the specific task cloud service A is a function for printing data into a business document format dedicated to a predetermined specific task.

In the present exemplary embodiment, the above-described application functions are preliminarily set by the administrator on the operation panel 210. However, the control unit 1 of the MFP 1000 may automatically determine whether the application functions are set, for example, upon start-up, and may automatically generate a list of the application function setting 903. The settings of application functions are not particularly limited.

FIG. 9 illustrates an example of a setting screen in which an MFP is installed in a user's home and is used for remote work and also for private use. In the present exemplary embodiment, the application functions, including the copy function, the printer driver print function, the photograph print function, the USB print function, and the scan function, are functions for private use. These functions are not set as the audit log acquisition target, and thus "not acquire" is set for the respective functions in the audit log acquisition setting 904. Further, the cloud print function, the cloud transmission function, and the function of printing for the specific task cloud service A are used for remote work and are set as the audit log acquisition target. Accordingly, "acquire" is set for the respective functions in the audit log acquisition setting 904.

In a case where the enter button 905 on the application-based audit log acquisition setting screen is pressed on the operation panel 210, the control unit 1 stores setting values in the HDD 204.

After the processing of step S0707, the processing proceeds to step S0708. In step S0708, the control unit 1 determines whether the acquired application-based audit log acquisition setting is enabled.

In step S0708, in a case where the control unit 1 determines that the acquired application-based audit log acquisition setting is disabled (NO in step S0708), the processing proceeds to step S0704. In step S0704, the control unit 1 returns an error. Then, the processing is terminated.

In step S0708, in a case where the control unit 1 determines that the acquired application-based audit log acquisition setting is enabled (YES in step S0708), the processing proceeds to step S0709.

In step S0709, the control unit 1 acquires, from the HDD 204, the audit log of the application function for which "acquire" is set in the audit log acquisition setting 904.

In step S0710, the control unit 1 determines whether the audit log that matches the audit log acquisition condition is acquired.

In step S0710, in a case where the control unit 1 determines that the audit log is acquired (YES in step S0710), the processing proceeds to step S0711. In step S0711, the control unit 1 generates audit log data to be transmitted to the management server 2000. The audit log data generated in this case includes the audit log, acquired in step S0709, of the application function for which "acquire" is set in the audit log acquisition setting 904, and does not include any audit log of applications for which "not acquire" is set. Then, the processing illustrated in FIG. 7 is terminated.

In step S0710, in a case where the control unit 1 determines that the audit log is not acquired (NO in step S0710), the processing proceeds to step S0704. In step S0704, the control unit 1 sends an error notification result to the management server 2000. Then, the processing illustrated in FIG. 7 is terminated.

By the processing of steps S0705 and S0707 to S0709 illustrated in FIG. 7 described above, the audit log based on the application functions (applications) included in each of the MFPs not including the user authentication function can be acquired. With the configuration, audit logs of work-related applications can be acquired and audit logs of private-use applications cannot be acquired, whereby audit logs can be collected without any adverse effect on user privacy.

After the processing illustrated in FIG. 7, the processing proceeds to step S0406 illustrated in FIG. 4. In step S0406, the control unit 1 returns the result to the management server 2000. In the processing of step S0406, in a case where the processing of step S0711 illustrated in FIG. 7 is already executed, audit log data is transmitted to the management server 2000. In a case where the processing of step S0704 illustrated in FIG. 7 is already executed, an error notification is transmitted to the management server 2000.

After the processing of step S0406, in a case where there is a different MFP as the audit log acquisition target, processing similar to the processing of steps S0404 to S0406 is performed on the different MFP. FIG. 4 illustrates an example where similar processing is performed on the MFPs 1001, 1002, . . . , and XXXX. The processing of steps S0407 to S0409, the processing of steps S0410 to S0412, and the processing of steps S0413 to S0415 are each similar to the processing of steps S0404 to S0406. There also can be a case where, for example, the acquisition destination MFP is powered off, or the network is disconnected, and thus no response is received from the MFP and the control unit 2 of the management server 2000 cannot acquire the audit log. In this case, according to the present exemplary embodiment, the control unit 2 sends the audit log acquisition instruction to the MFP again after a certain period of time. However, when the control unit 2 returns the result to the PC 02, processing for attaching information about an MFP from which a result cannot be acquired may be performed. The processing according to the present exemplary embodiment is not particularly limited.

In a case where the control unit 2 of the management server 2000 completes the acquisition of the audit log of the MFP as the audit log acquisition target, the processing proceeds to step S0416.

In step S0416, the control unit 2 combines the acquired audit logs.

In step S0417, the control unit 2 returns audit log data to the PC 02.

The acquisition of the audit log based on the applications included in each of the MFPs not including the user authentication function is controlled as described above.

The exemplary embodiment described above illustrates an example of control processing for acquiring, in response to the instruction from the PC 02, the audit log based on applications included in each of the MFPs not including the user authentication function.

However, a timing for acquiring the audit log acquisition instruction from the PC 02 is not particularly limited to the timing as described above. Alternatively, the management server 2000 may periodically acquire the audit log stored in the MFP 1000.

In such a case, the management server 2000 uses preliminarily acquired audit logs to provide an audit log in response to an instruction issued from the PC 02.

In another exemplary embodiment, a network configuration diagram, hardware and software configurations of the MFP 1000 and the management server 2000 each serving as an information processing apparatus, and print processing, such as reception of a print instruction and execution of printing, which are not illustrated, are similar to those in the above-described exemplary embodiment.

Figure 10:
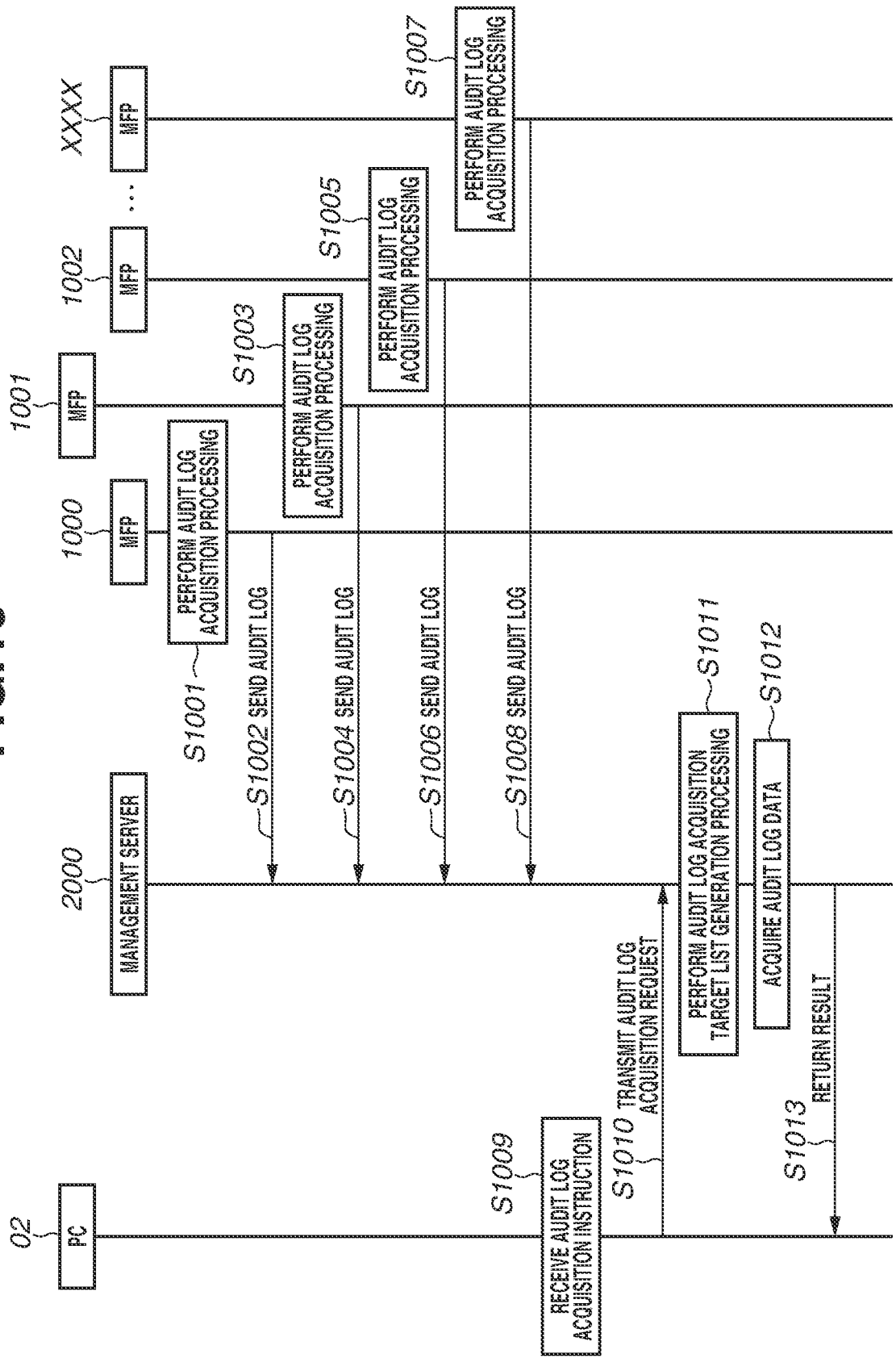
FIG. 10 is a sequence diagram illustrating an example of a processing procedure from reception of an audit log acquisition instruction to transmission of an audit log according to another exemplary embodiment.

FIG. 10 is a sequence diagram illustrating an overall processing procedure in a system according to the another exemplary embodiment from a process in which the management server 2000 preliminarily acquires audit logs from MFPs not including the audit log function to a process in which an audit log matching a condition is acquired in the management server 2000.

The system according to the present exemplary embodiment includes the MFPs 1000 to 1002 that perform user authentication, receive a print instruction by the operation unit, and perform printing control, the management server 2000 that acquires an audit log from each of the MFPs 1000 to 1002, and the PC 02 that shares the audit log acquired from the remote UI with the management server 2000. The management server 2000, the MFP 1000, the MFP 1001, and the MFP 1002 are separate apparatuses, but instead the function of the management server 2000 may be included in each of the MFPs 1000 to 1002. The configuration of the management server 2000 is not particularly limited.

This sequence is started when the MFPs transmit the audit log stored in the MFPs to the management server 2000 after a lapse of a certain period of time.

First, in step S1001, the control unit 1 of the MFP 1000 executes the audit log acquisition processing to acquire the audit log. The contents of the audit log acquisition processing will be described below with reference to FIG. 11.

Processing of steps S1003 and S1004, processing of steps S1005 and S1006, and processing of steps S1007 and S1008 are similar to the processing of steps S1001 and S1002.

In step S1009, the control unit 2 of the management server 2000 receives an audit log acquisition instruction from the user via the remote UI displayed on the PC 02.

Next, in step S1010, the PC 02 transmits the received audit log acquisition instruction as an audit log acquisition request to the management server 2000.

In step S1011, the control unit 2 performs audit log acquisition destination list generation processing. Details of the processing are similar to those of steps S0501 to S0506 illustrated in FIG. 5.

In step S1012, from the audit log acquisition destination list, the control unit 2 determines an MFP that has been used, and acquires an audit log that matches an acquisition condition. In step S1013, the management server 2000 returns the processing result to the PC 02. Then, the processing illustrated in FIG. 10 is terminated.

Figure 11:
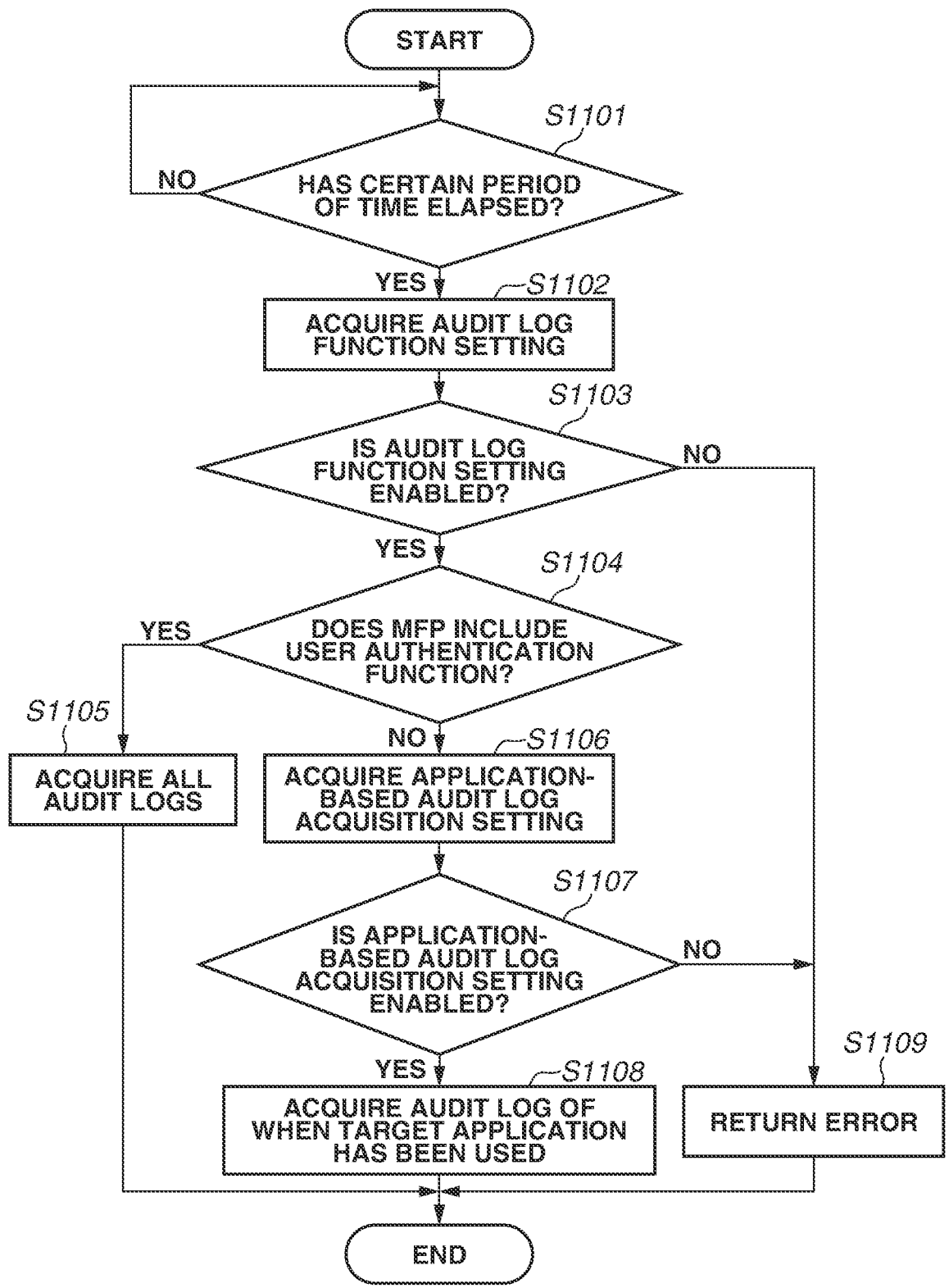
FIG. 11 is a flowchart illustrating an audit log acquisition processing procedure according to the another exemplary embodiment.

FIG. 11 is a flowchart illustrating the audit log acquisition processing performed in step S1001 illustrated in FIG. 10. This processing is achieved such that the CPU 201 of the control unit 1 loads programs in the RAM 203 and executes the loaded programs.

In step S1101, the control unit 1 determines whether a certain period of time has elapsed from previous transmission. In a case where the control unit 1 determines that the certain period of time has elapsed from the previous transmission (YES in step S1101), the processing proceeds to step S1102 for a procedure for acquiring an audit log. In the present exemplary embodiment, the processing proceeds to the flowchart for acquiring an audit log after a lapse of a certain period of time, but instead the processing may proceed to the procedure for acquiring an audit log when a certain amount of data is accumulated. The control unit 2 may be configured to determine that a certain period of time has elapsed and to issue an audit log acquisition instruction to each MFP.

In step S1102, the control unit 1 acquires a screen for setting the audit log function of the MFP 1000 from the HDD 204. FIG. 8 illustrates an example of the audit log function setting screen.

In step S1103, the control unit 1 determines whether the audit log function of the MFP 1000 is enabled.

In step S1103, in a case where the control unit 1 determines that the audit log function of the MFP 1000 is disabled (NO in step S1103), an audit log cannot be acquired and thus the processing proceeds to step S1109. In step S1109, the control unit 1 returns an error. Then, the processing illustrated in FIG. 11 is terminated.

In step S1103, in a case where the control unit 1 determines that the audit log function of the MFP 1000 is enabled (YES in step S1103), the processing proceeds to step S1104.

In step S1104, the control unit 1 determines whether the MFP 1000 includes the user authentication function. In a case where the MFP 1000 includes the user authentication function and the user authentication function is enabled, the control unit 1 can determine that the MFP 1000 includes the user authentication function. In a case where the MFP 1000 includes the user authentication function but the user authentication function is disabled, the control unit 1 determines that the MFP 1000 does not include the user authentication function. In the present exemplary embodiment, information about whether the MFP 1000 includes the user authentication function is preliminarily recorded as a program in the MFP 1000. In a case where the MFP 1000 includes the user authentication function, the control unit 1 performs the determination by acquiring a user authentication function setting from the HDD 204. In step S1104, in a case where the control unit 1 determines that the MFP 1000 includes the user authentication function (YES in step S1104), the processing proceeds to step S1105.

In step S1105, the control unit 1 acquires the audit log stored in the MFP 1000. In this case, all stored data are acquired without performing filtering or the like.

Although not illustrated, depending on a setting performed by the user, even in a case where the control unit 1 determines that the MFP 1000 includes the user authentication function (YES in step S1104), the processing may proceed to step S1106, and in step S1108, the audit log that is associated with identification information about the operating user obtained in the user authentication and that is a record of when the target application has been used may be acquired.

In step S1104, in a case where the control unit 1 determines that the MFP 1000 does not include the user authentication function (NO in step S1104), the processing proceeds to step S1106.

In step S1106, the control unit 1 acquires the application-based audit log acquisition setting, and then the processing proceeds to step S1107.

In step S1107, the control unit 1 determines whether the select button 902 on the application-based audit log acquisition setting acquired in step S1106 is enabled. In a case where the control unit 1 determines that the application-based audit log acquisition setting is disabled (NO in step S1107), the processing proceeds to step S1109. In step S1109, the control unit 1 returns an error. Then, the processing illustrated in FIG. 11 is terminated.

In step S1107, in a case where the control unit 1 determines that the application-based audit log acquisition setting acquired in step S1106 is enabled (YES in step S1107), the processing proceeds to step S1108.

In step S1108, the control unit 1 acquires, from the HDD 204, the audit log of the application function for which "acquire" is set in the audit log acquisition setting 904. Then, the processing illustrated in FIG. 11 is terminated. The audit log acquisition processing of step S1001 illustrated in FIG. 10 has been described in detail above.

In the another exemplary embodiment described above, the MFP 1000 transmits the audit log to the management server 2000 every certain period of time, without waiting for a log acquisition instruction issued from the management server 2000. In this case, the audit log to be transmitted to the management server 2000 is an audit log associated with the MFP that has transmitted the audit log. In terms of the concept of zero trust security, it is desirable to acquire an audit log associated with an ID. Thus, the management server 2000 may attach, to an audit log acquired from an MFP, an operating user ID of the operating user of the MFP that has transmitted the audit log, and may store the audit log to which the operating user ID has been attached.

In yet another exemplary embodiment different from the above-described exemplary embodiments, MFPs are installed in personal places, such as a home, and the MFPs are used by a limited number of people.

In the yet another exemplary embodiment different from the above-described exemplary embodiments, a network configuration, hardware and software configurations of the MFP 1000 and the management server 2000 each serving as an information processing apparatus, and print processing, such as reception of a print instruction and execution of printing, are similar to those in the above-described exemplary embodiments, and thus redundant descriptions thereof are omitted.

FIG. 12 is a flowchart illustrating a processing procedure that is performed by the control unit 2 of the management server 2000 in a case where the management server 2000 receives an audit log from an MFP not having the user authentication function. This processing is executed after steps S1002, S1004, S1006, and S1008 illustrated in FIG. 10.

In step S1201, the control unit receives an audit log from an MFP not having the user authentication function, and then the processing proceeds to step S1202. In the present exemplary embodiment, a device number of the MFP as a source of the received audit log is attached to the audit log acquired in step S1201.

In step S1202, the control unit 2 determines whether user ID information is included in the received audit log. In a case where the user ID information is included in the received audit log (YES in step S1202), the acquired audit log is stored in the HDD 224, and then the processing procedure is terminated. In a case where the user ID information is not included in the received audit log (NO in step S1202), the processing proceeds to step S1203.

In step S1203, the control unit 2 acquires the device number of the audit log target device from the received audit log. The device number may be described in the audit log, or may be acquired by referring to the device number from a number, such as an IP address, that is unique to the MFP. After the device number is acquired, the processing proceeds to step S1204.

In step S1204, based on the device number acquired by the control unit 2, a user ID associated with the device number is acquired from the acquisition target device setting for acquiring an audit log indicated in the management table in the screen 601 illustrated in FIG. 6. For example, in a case where the device number is "MFP 1005", the user ID "user007" matches the device number "MFP 1005" with reference to the acquisition target device setting 604 and the user ID setting 602. In a case where a plurality of user IDs is associated with a device number, an error message may be displayed for the administrator to prompt the administrator to perform a determination to acquire any one of the user IDs. Alternatively, each audit log may be associated with a corresponding one of user IDs of a plurality of users. The detailed acquisition method is not particularly limited.

In step S1205, the control unit 2 determines whether there is a user ID that matches the device number. In a case where the control unit 2 determines that there is a user ID that matches the device number (YES in step S1205), the processing proceeds to step S1206. In step S1206, the acquired user ID is attached to the received audit log, and the audit log to which the user ID is attached is stored in the HDD 224. On the other hand, in a case where the control unit 2 determines that there is no user ID that matches the device number (NO in step S1205), the processing proceeds to step S1207. For example, in a case where there is no user ID that matches the device number, or in a case where there is a plurality of user IDs that match the device number, the processing proceeds to step S1207. In step S1207, an error message is displayed and the audit log to which information that the user ID is unknown is attached is stored in the HDD 224.

After the processing of steps S1206 and S1207, the processing returns to step S1009 illustrated in FIG. 10.

In the procedure of the flowchart illustrated in FIG. 12, the management server 2000 attaches the user ID to the audit log received from the MFP not having the user authentication function, whereby an audit log in the same format as the audit log received from the MFP having the user authentication function can be acquired.

OTHER EXEMPLARY EMBODIMENTS

An object of embodiments of the present disclosure is attained by executing the following processing. That is, a storage medium storing a software program code for implementing functions of the above-described exemplary embodiments is supplied to a system or an apparatus, and a computer (or a CPU, a micro processing unit (MPU), etc.) of the system or the apparatus reads out the program code stored in the storage medium. In this case, embodiments of the present disclosure include the program code read out from the storage medium implements the functions of the above-described exemplary embodiments, and the program code and the storage medium storing the program code.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-030076, filed Feb. 26, 2021, which is hereby incorporated by reference herein in its entirety.

What is claimed is:

1. An image processing apparatus that communicates with a server via a network and is configured to use one or more application functions, the image processing apparatus comprising:
a storage unit configured to store a log in association with the one or more application functions and in association with an operating user;
a controller having one or more processors which implement instructions stored in at least one memory, the controller configured to function as:
a designation unit configured to designate the one or more application functions as an application function for which acquisition of a log by the server is allowed;
a generation unit configured to generate log data to be transmitted to the server based on an instruction for acquiring a log of the operating user of the image processing apparatus;
a transmission unit configured to transmit the log data generated by the generation unit to the server; and
a control unit configured to switch the log data to be generated by the generation unit based on whether a user authentication function of the image processing apparatus is enabled,
wherein in a case where user authentication is not performed, the log data to be generated by the generation unit is switched such that the log associated with the one or more application functions that are not designated by the designation unit is not generated, and the log associated with the one or more application functions designated by the designation unit is generated as a log to be transmitted to the server.

2. The image processing apparatus according to claim 1, wherein the controller is further configured to function as:
a determination unit configured to determine whether the user authentication function of the image processing apparatus is enabled.

3. The image processing apparatus according to claim 1, wherein the controller is further configured to function as:
a determination unit configured to determine whether the user authentication function of the image processing apparatus is enabled; and
a reception unit configured to receive, from the server, the instruction for acquiring the log of the operating user of the image processing apparatus, the operating user being designated as an audit target in the instruction,
wherein in a case where the user authentication function is enabled, the log of the operating user is transmitted.

4. The image processing apparatus according to claim 3, wherein in a case where the reception unit has received the instruction, the transmission unit does not transmit the log associated with the one or more application functions that are not designated by the designation unit, to the server, and transmits the log associated with the one or more application functions designated by the designation unit, to the server.

5. The image processing apparatus according to claim 1, wherein in a case where a predetermined period of time has elapsed from a previous transmission, the transmission unit transmits the log associated with the one or more application functions designated by the designation unit.

6. The image processing apparatus according to claim 1, wherein in a case where acquisition of the log associated with the one or more application functions designated by the designation unit has been failed, an error is transmitted to the server.

7. The image processing apparatus according to claim 1, wherein the network includes at least a network that is not protected by a firewall.

8. The image processing apparatus according to claim 1, wherein the log is an audit log which is a record of an operation of the image processing apparatus recorded as a log.

9. A server that communicates with an image processing apparatus via a network, the image processing apparatus being configured to use one or more application functions, the server comprising:
an instruction reception unit configured to receive an instruction for acquiring a log of an operating user of the image processing apparatus from a user, the operating user being designated as an audit target in the instruction;
a storage unit configured to store a management table storing identification information about the operating user and a device number of the image processing apparatus in association with each other;
a transmission unit configured to transmit the instruction received by the instruction reception unit to one or more of the image processing apparatuses;
a log reception unit configured to receive, from an image processing apparatus including a user authentication function, a log associated with the identification information about the operating user, and to receive, from an image processing apparatus not including the user authentication function, a log associated with a certain application function; and
a determination unit configured to determine whether the received log is associated with the identification information about the operating user, wherein in a case where the received log is not associated with the identification information about the operating user, the identification information about the operating user that matches the device number is acquired using the management table, and the acquired identification information about the operating user is associated with the received log,
wherein the image processing apparatus to which the instruction is transmitted by the transmission unit is one or more image processing apparatuses which have been used by the operating user associated in the management table.

10. The server according to claim 9, further comprising:
a display unit configured to display the received log,
wherein the display unit combines the log(s) received from one or more of the image processing apparatuses and displays the combined logs.

11. The server according to claim 9, wherein the network includes at least a network that is not protected by a firewall.

12. The server according to claim 9, wherein the log is an audit log which is a record of an operation of the image processing apparatus recorded as a log.

13. A control method of an image processing apparatus that communicates with a server via a network, the image processing apparatus being configured to use one or more application functions, the control method comprising:

storing a log in association with the one or more application functions and in association with an operating user;

designating the one or more application functions as an application function for which acquisition of a log by the server is allowed;

generating log data to be transmitted to the server based on an instruction for acquiring a log of the operating user of the image processing apparatus;

transmitting the log data to the server; and switching the log data based on whether a user authentication function of the image processing apparatus is enabled, wherein in a case where user authentication is not performed, the log data generated in the generating is switched such that the log associated with the one or more application functions that are not designated in the designating is not generated, and the log associated with the one or more application functions designated in the designating is generated as a log to be transmitted to the server.

14. A control method of a server that communicates with an image processing apparatus via a network, the image processing apparatuses being configured to use one or more application functions, the control method comprising:

receiving an instruction from a user, the instruction being for acquiring a log of an operating user of the image processing apparatus, the operating user being designated as an audit target in the instruction;

storing a management table storing identification information about the operating user and a device number of the image processing apparatus in association with each other;

transmitting the instruction to one or more of the image processing apparatuses;

receiving, from an image processing apparatus including a user authentication function, a log associated with the identification information about the operating user, and receiving, from an image processing apparatus not including the user authentication function, a log associated with a certain application function;

determining whether the received log is associated with the identification information about the operating user; and acquiring, in a case where the received log is not associated with the identification information about the operating user, the identification information about the operating user that matches the device number of the image processing apparatus using the management table, and associating the acquired identification information about the operating user with the received log, the device number and the identification information about the operating user being associated in the management table, wherein the image processing apparatus to which the instruction is transmitted is one or more image processing apparatuses which have been used by the operating user associated in the management table.

* * * * *